UNITED STATES PATENT OFFICE.

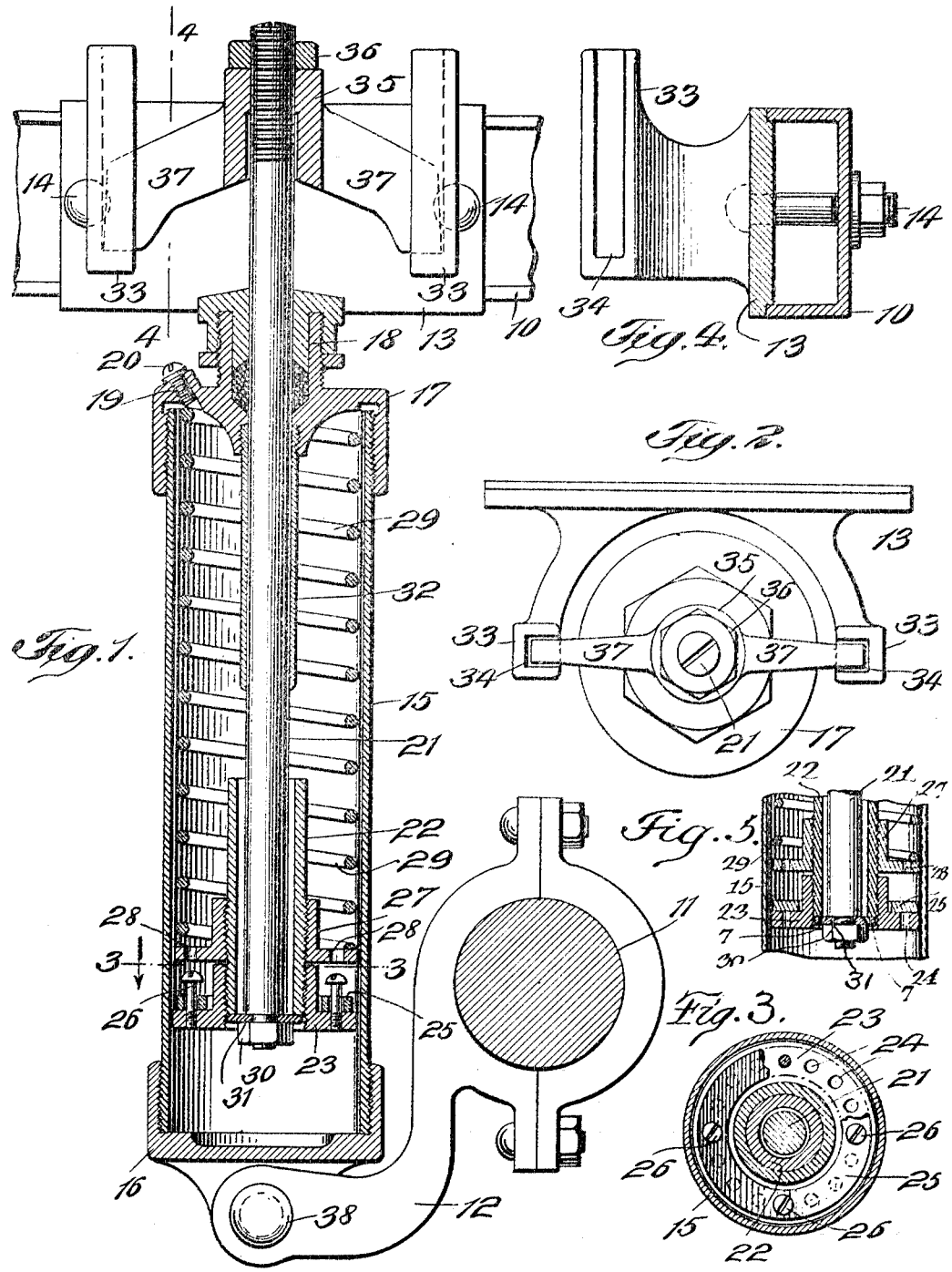

WILLIAM BARDSLEY, OF KEARNEY, NEW JERSEY.

SHOCK-ABSORBER.

1,105,603.

Specification of Letters Patent.

Patented Aug. 4, 1914.

Application filed April 12, 1913. Serial No. 760,619.

*To all whom it may concern:*

Be it known that I, WILLIAM BARDSLEY, a citizen of the United States, and a resident of Kearney, in the county of Hudson and State of New Jersey, have invented certain new and useful Improvements in Shock-Absorbers, of which the following is a specification.

The invention relates to improvements in shock-absorbers of the character adapted for use on motor vehicles and the like to relieve the jolting commonly caused in the vehicle body during travel over rough road-beds.

The object of the invention is to provide durable and entirely efficient means interposed between the axle and body portion of an automobile or the like to obviate undue jolting of the body of the vehicle and to reduce strain on the vehicle-parts during the travel of the vehicle over uneven surfaces.

The shock absorber of my invention comprises a liquid checking cylinder containing a valved piston and piston-rod and also a spring under compression normally acting to press the piston and piston-rod to their lower position. The checking cylinder is also provided with means for relieving the pressure of the liquid from the stuffing-box or gland through which the piston-rod passes at the upper end of the cylinder.

A special feature of my invention resides in the manner in which I connect the piston-rod with the side frame of the chassis or other part of the body of the vehicle, and in this respect instead of fastening the upper end of the piston-rod rigidly to the chassis frame or body of the vehicle, I provide means for slidably connecting the rod with such frame or body of the vehicle, said means allowing the body of the vehicle to descend on the compression of the supporting springs without acting against the piston-rod or operating to drive said rod downwardly within the cylinder.

In accordance with my invention the shock-absorber does not interfere with the natural action of the springs of the vehicle during the ordinary travel of the car, nor during the compression of the springs when the car passes over uneven surfaces, but does act to check the recoil action of the supporting springs. The connection of the upper end of the piston-rod with the chassis frame or vehicle body is such that the upward movement of said frame or body will draw the piston-rod upwardly, but that the downward movement of said frame or body has no effect upon the piston-rod and is independent thereof, said rod however being caused to descend substantially simultaneously with the descent of the frame or body by means of the compression spring confined within the checking cylinder and acting to move the piston and rod downwardly therein.

The invention will be fully understood from the detailed description hereinafter presented, reference being had to the accompanying drawings, in which:

Figure 1 is a central vertical section through the main parts of my shock-absorber, the axle of the vehicle being shown in transverse section and a portion of the chassis frame of the body of the vehicle being illustrated in side elevation; Fig. 2 is a top view of the shock-absorber detached from the vehicle; Fig. 3 is a transverse section through the shock-absorber cylinder on the dotted line 3—3 of Fig. 1, a portion of the ring valve being broken away, Fig. 4 is a vertical section through the chassis frame and bracket for the upper end of the piston-rod taken on the dotted line 4—4 of Fig. 1, and Fig. 5 is a vertical section through a lower portion of the cylinder and coöperative parts taken at an angle of forty-five degrees to the section of Fig. 1.

In the drawings, 10 designates a portion of the chassis frame and 11 the usual axle of the vehicle, and between said axle and said frame I interpose the shock-absorber of my invention, said shock-absorber being connected with the axle 11 by means of a bracket 12 and slidably connected with the frame 10 by means of a bracket 13 of special construction secured to said frame by bolts 14 or other convenient means.

The shock-absorber comprises a cylinder 15 having on its lower end a cap 16 and at its upper end a cap 17 containing a gland 18 and provided with an inlet opening 19 through which liquid may be introduced to the cylinder and which is adapted to be closed by means of a screw 20. Within the cylinder 15 is provided a piston-rod 21 which projects upwardly through the cap 17 and is encompassed about its lower end portion by a sleeve 22, which is normally free from the sides of said rod and has threaded upon it a piston 23 of right angular formation in cross-section and provided in its horizontal portion with a series of vertical openings 24 over which is placed a ring valve 25, the latter being loosely held upon screws 26 so as to be elevated from the holes 24 on the descent of the piston 23 and to close said holes on the ascent of said piston. Upon the sleeve 22, above the piston 23, is secured, preferably by screw threads, a correspondingly shaped piston or collar 27 having in its horizontal portion a series of openings 28, which are always open. The piston 27 constitutes a collar extending from the sleeve 22 to afford a bearing for the lower end of a coiled compression spring 29 which is confined between said piston 27 and the upper end or cap 17 of the cylinder. The spring 29 is always under compression and its normal tendency is to press the sleeve 22, piston 23 and piston-rod 21 downwardly within the cylinder 15. On the lower reduced end of the piston-rod 21 is provided a nut 30 and washer 31, the latter at its outer edges being below and in engagement with the lower edges of the sleeve 22. The downward pressure of the spring 29 acting through the sleeve 22 and washer 31 serves to move the piston-rod 21 downwardly with every downward movement of the sleeve 22, and with every upward movement of the piston-rod 21 the washer 31 acting through the sleeve 22 serves to move the piston 23 upwardly, so that at all times the spring, piston-rod, sleeve and piston may have coöperative simultaneous action. The washer 31 has an opening or openings 7 through it for the escape downwardly of any fluid which may be within the sleeve 22 during the upward movement of the piston 23. I secure to the lower side of the cap 17 a depending sleeve 32, which snugly, though with sufficient freedom, encompasses the rod 21 and is of such proportions that when the occasion arises the sleeve 22 may pass upwardly upon or telescope with it. The cylinder 15 will be completely filled with a suitable liquid to operate as a checking medium, and preferably this liquid will be of an oil nature.

The bracket 13 secured to the chassis frame 10 or other part of the vehicle body, is formed with two outwardly projecting vertical members 33 containing grooves 34 in their facing sides, which grooves are closed at their lower ends and open at their upper ends and receive the ends of a two-armed frame 35 secured upon the upper end of the piston-rod 21. The frame 35 is threaded in a central opening therein to engage the thread on the upper end of the rod 21 and said frame is further secured on said rod by means of a nut 36. The frame 35 may be adjusted on the upper end of the rod 21 to suit the special conditions that may be met in applying the absorber to a car. I indicate the two arms of the frame 35 by the numeral 37, and it will be seen on reference to Fig. 1 that these arms are slidable in the grooves 34 and that normally they are held by the spring 29 against the lower horizontal walls of said grooves. It will also be seen that upon any sudden depression of the chassis frame or vehicle body, the bracket 13 secured to such frame or body may descend without acting on the frame 35 or piston-rod 21.

Fig. 1 shows the parts of the shock absorber in a normal position, the spring 29 being under compression and holding the arms 37 of the frame 35 seated in the bottoms of the grooves 34, and the pivot 38 permitting the cylinder 15 to sway with the ordinary horizontal movements of the vehicle body. Upon a depression of the vehicle body, as when passing over an uneven surface, said body will descend without acting against the frame 35 or piston-rod 21, but at such time the spring 29 will cause the rod 21 and frame 35 to travel downwardly and effect the depression of the piston 23 against the liquid in the lower end of the cylinder 15, with the result that the ring-valve 25 will be elevated and the liquid will flow with considerable freedom through the openings 24 to the upper side of the piston 23. Thereafter as the vehicle body or chassis frame ascends, the bracket 13, by engaging the frame 35, will force the piston-rod 21 to its upper position and elevate the piston 23 and sleeve 22, but at this time the holes 24 in the piston 23 will remain closed and the liquid above the piston will check and cushion the upward movement of the vehicle body, piston-rod and piston by its confinement and the fact that it must find its way through the restricted space around the piston into the lower end of the cylinder 15. When the vehicle frame or body descends the piston 23 moves downwardly with considerable freedom, but when the vehicle frame or body ascends and through the rod 21 elevates the piston 23, the movement of the rod and piston is considerably checked by the liquid above the piston, and this serves to arrest the usual upward rebound of the vehicle springs and tends to prevent said springs from becoming broken.

My shock-absorber allows the springs of the vehicle to operate in their natural way as springs and does not tend to hold them rigid or inflexible, but is efficient to arrest the rebound action of the springs. The arrangement of the sleeves or tubes 22, 32 is of considerable advantage in that on the upward stroke of the piston 23 beyond its normal position, the sleeve 22 may telescope upon the sleeve 32 and thus relieve the pressure of the liquid from the gland or stuffing box at the upper end of the cylinder, the liquid in the sleeve 22 at such time being permitted to escape downwardly through the openings 7 in the washer 31. This feature of the construction is important in preventing leakage from the cylinder 15, which is quite necessary in preserving the efficiency of the absorber. The piston 23 is normally a short distance above the bottom of the cylinder. In case of an extraordinary depression of the vehicle springs, the bracket 13 may slide downwardly on the frame 35 after the piston 23 has reached its lower position, and said bracket on the rebound will engage the arms 37 and pull the rod 21 upwardly to create the proper checking action. In the event of such extraordinary depression of the vehicle springs the upper end of the cylinder 15 may pass between the arms 33 of the bracket 13 without striking said bracket.

What I claim as my invention and desire to secure by Letters Patent, is:—

1. In combination with the body and axle of a vehicle, a shock-absorber interposed between said parts comprising a liquid checking cylinder containing a piston-rod, piston and coined spring encompasing said rod within said cylinder and acting to depress the piston and piston-rod, and means connected with the body of the vehicle supporting said rod in its upper position in opposition to the force of said spring and adapted to yield therefrom on the depression of said body.

2. In combination with the body and axle of a vehicle, a shock-absorber interposed between said parts comprising a checking cylinder having a piston-rod, piston and spring acting to depress the piston and piston-rod, and a bracket connected with the body of the vehicle having guiding means for said rod and normally supporting the same in its upper position in opposition to the force of said spring, said bracket being free to recede downwardly independently of said rod on the depression of said body.

3. In combination with the body and axle of a vehicle, a shock-absorber interposed between said parts comprising a checking cylinder having a piston-rod, piston and spring acting to depress the piston and piston-rod, said piston-rod having a frame-member on its upper exposed end, and a bracket connected with the body of the vehicle retaining and affording a guide for said rod and extending below said frame-member to support said rod in its upper position in opposition to the force of said spring and recede therefrom on the depression of said body.

4. In combination with the body and axle of a vehicle, a shock-absorber interposed between said parts comprising a checking cylinder having a piston-rod, piston and spring acting to depress the piston and piston-rod, said piston-rod having a frame-member on its upper exposed end having oppositely extended arms, and a bracket connected with the body of the vehicle having projecting members containing grooves in their facing sides to receive and guide the ends of said arms, said grooves at their lower walls supporting said arms and rod in opposition to the force of said spring and permitting the body of the vehicle to descend without acting on said rod.

5. In combination with the body and axle of a vehicle, a shock-absorber interposed between said parts comprising a checking cylinder having a piston-rod, piston and spring acting to depress the piston and piston-rod, said piston-rod having a frame-member on its upper exposed end having oppositely extended arms, and a bracket connected with the body of the vehicle having projecting members containing grooves in their facing sides to receive and guide the ends of said arms, said grooves at their lower walls supporting said arms and rod in opposition to the force of said spring and permitting the body of the vehicle to descend without acting on said rod, and said projecting members being separated sufficiently to freely receive between them, when necessary, the upper end of said cylinder.

6. In combination with the body and axle of a vehicle, a shock-absorber interposed between said parts comprising a checking cylinder having a cap and gland at its upper end and containing a piston-rod, a piston, a tube depending from said cap and encompassing said rod, and a sleeve encompassing the lower end of said rod and movable therewith and with said piston and arranged to telescope with said tube to protect said gland from excessive pressure of the checking fluid, said sleeve having at its lower end an escape outlet therefrom for the fluid.

7. In combination with the body and axle of a vehicle, a shock-absorber interposed between said parts comprising a checking cylinder having a cap and gland at its upper end and containing a piston-rod, a piston, a tube depending from said cap and encompassing said rod, a sleeve encompassing the lower end of said rod and movable therewith and with said piston and arranged to telescope with said tube to protect said gland from excessive pressure of the checking fluid, a collar on said sleeve above said piston, a compression spring between said collar and the upper end of said cylinder, and a washer on the lower end of said rod extending below said sleeve, said piston having valved ports and being secured on said sleeve, and said sleeve having at its lower end an escape outlet for the fluid therefrom.

Signed at New York city, in the county of New York and State of New York, this 11th day of April A. D. 1913.

WILLIAM BARDSLEY.

Witnesses:
ARTHUR MARION,
CHAS. C. GILL.